United States Patent
Pigeon et al.

(10) Patent No.: US 11,561,997 B2
(45) Date of Patent: Jan. 24, 2023

(54) METHODS, SYSTEMS, AND COMPUTER READABLE MEDIA FOR DATA TRANSLATION USING A REPRESENTATIONAL STATE TRANSFER (REST) APPLICATION PROGRAMMING INTERFACE (API)

(71) Applicant: Oracle International Corporation, Redwood Shores, CA (US)

(72) Inventors: Alain Pigeon, Plano, TX (US); Brian James Dueck, Collingwood (CA); Prakash John Thomas, Frisco, TX (US); Deepankar Dey, Mississauga (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/352,738

(22) Filed: Mar. 13, 2019

(65) Prior Publication Data
US 2020/0293541 A1 Sep. 17, 2020

(51) Int. Cl.
*G06F 16/00* (2019.01)
*G06F 16/25* (2019.01)
(Continued)

(52) U.S. Cl.
CPC .......... *G06F 16/258* (2019.01); *G06F 9/54* (2013.01); *G06F 16/2365* (2019.01); *H04L 67/02* (2013.01); *H04L 67/34* (2013.01)

(58) Field of Classification Search
None
See application file for complete search history.

(56) References Cited

U.S. PATENT DOCUMENTS

| 5,577,198 A | 11/1996 | Willrett et al. |
| 5,669,000 A | 9/1997 | Jessen et al. |

(Continued)

FOREIGN PATENT DOCUMENTS

| CN | 103414835 A | 11/2013 |
| EP | 0 347 360 A2 | 5/1989 |

(Continued)

OTHER PUBLICATIONS

Sundvall, E., Nyström, M., Karlsson, D., Eneling, M., Chen, R. and Örman, H., 2013. Applying representational state transfer (REST) architecture to archetype-based electronic health record systems. BMC medical informatics and decision making, 13(1), pp. 1-25. (Year: 2013).*

(Continued)

*Primary Examiner* — Farhan M Syed
(74) *Attorney, Agent, or Firm* — Jenkins, Wilson, Taylor & Hunt, P.A.

(57) ABSTRACT

According to one method, the method comprises: receiving, from a client via a REST API, input in a first format; converting, using predetermined metadata, the input in the first format into input in a second format; sending the input in the second format to a legacy system for performing an operation using the input in the second format; receiving, from the legacy system, output in the second format, wherein the output is based at least in part on the operation performed using the input in the second format; converting, using the predetermined metadata, the output in the second format into output in the first format; and sending, to the client via the REST API, the output in the first format.

20 Claims, 10 Drawing Sheets

(51) Int. Cl.
*G06F 16/23* (2019.01)
*G06F 9/54* (2006.01)
*H04L 67/02* (2022.01)
*H04L 67/00* (2022.01)

(56) References Cited

U.S. PATENT DOCUMENTS

| | | | |
|---|---|---|---|
| 5,732,213 A | 3/1998 | Gessel et al. | |
| 5,754,755 A | 5/1998 | Smith, Jr. | |
| 5,987,633 A | 11/1999 | Newman et al. | |
| 6,148,277 A | 11/2000 | Asava et al. | |
| 6,158,031 A | 12/2000 | Mack et al. | |
| 6,243,835 B1 | 6/2001 | Enokido et al. | |
| 6,493,425 B1 | 12/2002 | Abe | |
| 7,117,411 B2 | 10/2006 | McNeely et al. | |
| 7,299,382 B2 | 11/2007 | Jorapur | |
| 8,028,276 B1 | 9/2011 | Bessonov | |
| 8,397,128 B1* | 3/2013 | Alonzo | G06Q 10/067 714/759 |
| 8,561,036 B1 | 10/2013 | Beans et al. | |
| 9,331,967 B2 | 5/2016 | Gangadharan et al. | |
| 9,503,581 B2 | 11/2016 | Sayko | |
| 9,602,405 B1 | 3/2017 | Sharma et al. | |
| 9,639,714 B1 | 5/2017 | Carlson et al. | |
| 9,648,052 B2 | 5/2017 | Gangadharan et al. | |
| 9,692,911 B1 | 6/2017 | Chowdhury et al. | |
| 9,712,593 B2 | 7/2017 | Gangadharan et al. | |
| 9,762,533 B2 | 9/2017 | Ren et al. | |
| 9,819,655 B1 | 11/2017 | Desai et al. | |
| 9,819,719 B2 | 11/2017 | Hasson et al. | |
| 9,820,015 B2* | 11/2017 | Malamal Vadakital | H04N 21/85406 |
| 10,095,488 B2* | 10/2018 | Ebner | G06F 8/35 |
| 10,209,892 B2* | 2/2019 | Todd | G06F 11/1453 |
| 10,268,570 B2 | 4/2019 | Morris | |
| 10,324,695 B2* | 6/2019 | Champagne | G06F 8/51 |
| 10,341,411 B2* | 7/2019 | Zaidi | G06F 16/27 |
| 10,353,750 B2* | 7/2019 | P | G06F 9/541 |
| 10,404,758 B2* | 9/2019 | Straub | H04L 67/568 |
| 10,698,880 B2* | 6/2020 | Patiejunas | G06F 16/219 |
| 10,740,286 B1* | 8/2020 | Gilderman | G06F 9/5038 |
| 11,095,691 B2 | 8/2021 | Zhang et al. | |
| 2002/0109879 A1 | 8/2002 | Wing So | |
| 2002/0162059 A1 | 10/2002 | McNeely et al. | |
| 2003/0138765 A1* | 7/2003 | Bowers | G09B 5/06 434/322 |
| 2005/0182843 A1 | 8/2005 | Reistad et al. | |
| 2005/0242973 A1 | 11/2005 | Liebl et al. | |
| 2006/0069970 A1* | 3/2006 | Bowers | G09B 7/00 714/724 |
| 2007/0162894 A1 | 7/2007 | Noller et al. | |
| 2009/0044231 A1 | 2/2009 | Oh et al. | |
| 2009/0249076 A1* | 10/2009 | Reed | H04L 9/3228 713/168 |
| 2009/0286560 A1* | 11/2009 | Willis | G06F 16/683 707/999.107 |
| 2010/0217877 A1 | 8/2010 | Willars et al. | |
| 2010/0218168 A1 | 8/2010 | Gonzales, II | |
| 2011/0059770 A1* | 3/2011 | Silverbrook | H04M 1/72445 455/556.1 |
| 2011/0083122 A1 | 4/2011 | Chen et al. | |
| 2011/0099465 A1* | 4/2011 | Haberl | G06F 40/18 715/217 |
| 2012/0072422 A1* | 3/2012 | Rollins | G06F 40/205 707/E17.089 |
| 2013/0128882 A1 | 5/2013 | Lawson et al. | |
| 2013/0152047 A1 | 6/2013 | Moorthi et al. | |
| 2013/0170561 A1* | 7/2013 | Hannuksela | H04N 19/188 375/240.25 |
| 2014/0075415 A1 | 3/2014 | Goldish et al. | |
| 2014/0126714 A1 | 5/2014 | Sayko | |
| 2014/0222890 A1 | 8/2014 | Zhu et al. | |
| 2014/0289303 A1 | 9/2014 | Tarricone et al. | |
| 2015/0193494 A1* | 7/2015 | Malamal Vadakital | H04N 21/85406 707/697 |
| 2015/0201045 A1 | 7/2015 | Komirelly et al. | |
| 2015/0229635 A1 | 8/2015 | Sarldakl et al. | |
| 2015/0280963 A1 | 10/2015 | Bollapalli et al. | |
| 2015/0310087 A1* | 10/2015 | Tidwell | G06F 16/258 707/738 |
| 2016/0014142 A1 | 1/2016 | Wang et al. | |
| 2016/0019033 A1* | 1/2016 | Ebner | G06F 8/38 717/104 |
| 2016/0062753 A1* | 3/2016 | Champagne | G06F 8/51 717/137 |
| 2016/0219026 A1 | 7/2016 | Gangadharan et al. | |
| 2016/0294786 A1 | 10/2016 | Marquez Mendoza et al. | |
| 2016/0337395 A1 | 11/2016 | Bhalerao et al. | |
| 2016/0371143 A1 | 12/2016 | Resch et al. | |
| 2017/0180565 A1 | 6/2017 | Chowdhurry et al. | |
| 2017/0244628 A1 | 8/2017 | Chen | |
| 2017/0251026 A1* | 8/2017 | Straub | H04L 65/612 |
| 2017/0322873 A1 | 11/2017 | Morris | |
| 2018/0253342 A1* | 9/2018 | Gopalakrishnan | G06F 9/541 |
| 2018/0288127 A1* | 10/2018 | Zaidi | H04L 67/02 |
| 2018/0338002 A1* | 11/2018 | Sherrill | G06F 21/00 |
| 2019/0042211 A1* | 2/2019 | Ebner | G06F 16/00 |
| 2019/0079984 A1* | 3/2019 | Lancaster | G06F 16/285 |
| 2019/0141006 A1* | 5/2019 | Schnitt | G06Q 30/06 |
| 2020/0059497 A1* | 2/2020 | Straub | H04L 65/102 |
| 2020/0412770 A1 | 12/2020 | Zhang et al. | |

FOREIGN PATENT DOCUMENTS

| | | |
|---|---|---|
| EP | 0 973 296 A2 | 1/2000 |
| EP | 2 582 124 A1 | 4/2013 |
| EP | 1 882 250 B1 | 3/2016 |
| EP | 3 603 021 B1 | 6/2022 |
| JP | 2012079044 A | 4/2012 |
| JP | 7046974 B | 4/2022 |
| WO | WO 00/36793 | 6/2000 |
| WO | WO 01/52502 A2 | 7/2001 |
| WO | WO 02/056541 A2 | 7/2002 |
| WO | WO-2016/083751 A1 | 6/2016 |
| WO | WO 2016/156256 A1 | 10/2016 |
| WO | WO-2017/129708 A1 | 8/2017 |
| WO | WO 2018/182843 A1 | 10/2018 |
| WO | WO 2020/263492 A1 | 12/2020 |

OTHER PUBLICATIONS

Costa, B., Pires, P.F., Delicato, F.C. and Merson, P., 2016. Evaluating REST architectures—Approach, tooling and guidelines. Journal of Systems and Software, 112, pp. 156-180. (Year: 2016).*

Khan, N., Yaqoob, I., Hashem, I.A.T., Inayat, Z., Mahmoud Ali, W.K., Alam, M., Shiraz, M. and Gani, A., 2014. Big data: survey, technologies, opportunities, and challenges. The scientific world journal, 2014. (Year: 2014).*

Notification of Transmittal of the International Search Report and the Written Opinion of the International Searching Authority, or the Declaration for International Application No. PCT/US2020/035002 (dated Aug. 21, 2020).

Notification of Transmittal of the International Search Report and the Written Opinion of the International Searching Authority, or the Declaration for International Application No. PCT/US2020/022090 (dated Jun. 17, 2020).

"OnSIP for WebRTC Developers," The Business Voice, OnSIP, Junction Networks, pp. 1-4 (2019).

Kaplan Acme Packet, "Requirements for Interworking WebRTC with Current SIP Deployments," Network Working Group, pp. 1-24 (Nov. 22, 2011).

Notice of Allowability for U.S. Appl. No. 15/473,519 (dated May 23, 2019).

Notice of Allowability for U.S. Appl. No. 15/473,519 (dated Mar. 25, 2019).

Notice of Allowance and Fee(s) Due and Examiner-Initiated Interview Summary for U.S. Appl. No. 15/473,519 (dated Feb. 6, 2019).

(56) References Cited

OTHER PUBLICATIONS

Applicant-Initiated Interview Summary for U.S. Appl. No. 15/473,519 (dated Nov. 20, 2018).
Non-Final Office Action for U.S. Appl. No. 15/473,519 (dated Sep. 7, 2018).
Notification of Transmittal of the International Search Report and the Written Opinion of the International Searching Authority, or the Declaration for International Application No. PCT/US2018/016042 (dated Apr. 30, 2018).
Commonly-assigned, co-pending International Patent Application Serial No. PCT/US18/16042 for "Methods, Systems, and Computer Readable Media for Providing Message Encode/Decode as a Service," (Unpublished, filed Jan. 30, 2018).
Bray, "The JavaScript Object Notation (JSON) Data Interchange Format", Internet Engineering Task Force (IETF) Request for Comments: 8259, pp. 1-16 (Dec. 2017).
Commonly-assigned, co-pending U.S. Appl. No. 15/473,519 for "Methods, Systems, and Computer Readable Media for Providing Message Encode/Decode as a Service," (Unpublished, filed Mar. 29, 2017).
"Oracle Communications Billing and Revenue Managemen Developer's Guide", Relase 7.5, E16702-16, Oracle, pp. 1-770 (Aug. 2016).
Donovan, "Diameter Routing Message Priority," RFC 7944, pp. 1-18 (Aug. 2016).
Li et al., "Cloud Transcoder: Bridging the Format and Resolution Gap between Internet Videos and Mobile Devices," NOSSDAV' 12, pp. 33-38 (Jun. 7-8, 2012).
Notice of Allowace and Fee(s) Due & Examiner-Initiated Interview Summary for U.S. Appl. No. 14/973,625 (dated Feb. 2, 2017).
Non-Final Office Action for U.S. Appl. No. 14/973,625 (dated Sep. 8, 2016).
"Universal Mobile Telecommunications System (UMTS); LTE; Policy and charging control over Rx reference point (3GPP TS 29.214 version 10.3.0 Release 10)," ETSI TS 129 214 V10.3.0, pp. 1-52 (Jun. 2011).
"Camiant's Policy Server," Products, Camiant: The Leader in Policy Control (Feb. 8, 2007). http://web.archive.org/web/20070208062144/ http://www.camiant.com/products2.shtml.
Handley et al., "SDP: Session Description Protocol," RFC 4566, pp. 1-49 (Jul. 2006).
Notice of Allowance and Fee(s) Due for U.S. Appl. No. 15/147,887 (dated Dec. 13, 2018).
Applicant-Initiated Interview Summary for U.S. Appl. No. 15/147,887 (dated Oct. 16, 2018).
Non-Final Office Action for U.S. Appl. No. 15/147,887 (dated Jul. 12, 2018).
Advisory Action Before the Filing of an Appeal Brief and AFCP 2.0 Decision for U.S. Appl. No. 15/147,887 (dated May 25, 2018).
Applicant-Initiated Interview Summary for U.S. Appl. No. 15/147,887 (dated Apr. 12, 2018).
Final Office Action for U.S. Appl. No. 15/147,887 (dated Feb. 9, 2018).
Applicant-Initiated Interview Summary for U.S. Appl. No. 15/147,887 (dated Nov. 15, 2017).
Non-Final Office Action for U.S. Appl. No. 15/147,887 (dated Aug. 10, 2017).
"Black Box," Wikipedia.org website, pp. 1-9 (Apr. 27, 2016).
"Configure unit tests by using a .runsettings file," Microsoft Developer Network website (msdn.microsoft.com), pp. 1-4 (Apr. 11, 2016).
"INI file," Wikipedia.org website, pp. 1-11 (Mar. 8, 2016).
Vogel, "Unit Testing with JUnit—Tutorial," Vogella.com website, pp. 1-31 (Sep. 21, 2015).
Notice of Allowance and Fee(s) Due for U.S. Appl. No. 10/011,673 (dated Feb. 14, 2006).
Response to Rule 312 Communication for U.S. Appl. No. 10/011,673 (dated Dec. 27, 2005).
Notice of Allowance and Fee(s) Due and Interview Summary for U.S. Appl. No. 10/011,673 (dated Jul. 14, 2005).
Non-Final Office Action for U.S. Appl. No. 10/011,673 (dated Sep. 14, 2004).
International Search Report for International Application No. PCT/US 01/48677 (dated Oct. 14, 2002).
"Expect," NIST, https://www.nist.gov/services-resources/software/expect, pp. 1-4 (Aug. 31, 2016).
Communication of European Publication Number and Information on the Application of Article 67(3) EPC for European Patent Application Serial No. 18706337.5 (dated Jan. 9, 2020).
"WebRTC Gateway for Enterprise," Ribbon Communications Operating Company Inc., pp. 1-6 (2019).
"What is SIP Interconnect?," tokbox, pp. 1-3 (2019).
"In order for the OpenTok SIP Interconnect to work you need to configure your SIP gateway to interoperate with the OpenTok platform," pp. 1-1 (2019).
"OpenTok is the leading WebRTC platform for interactive video, enabling voice, video and messaging for mobile and web with our Live Video API," pp. 1-1 (2019).
"WebRTC Gateway Extend the capabilities of existing infrastructure without costly upgrades or new hardware purchases," Twilio, pp. 1-11 (2019).
"Embed IP communications into a web interface," Twilio, pp. 1-8 (2019).
"WebRTC to SIP calling: How to Call A Desk Phone From A WebRTC-enabled Browser," Junction Networks, pp. 1-4 (2019).
"SIP Signaling for WebRTC Apps," Junction Networks, pp. 1-4 (2019).
"WebRTC: The Next Innovation in Communication," Junction Networks, pp. 1-4 (2019).
"WebRTC to PSTN: Making Calls To and From the PSTN With WebRTC," Junction Networks, pp. 1-3(2019).
"Solution Design Guide for Cisco Unified Contact Center Enterprise, Release 11.5," Cisco, pp. 1-108 (Jan. 3, 2018).
"WebRTC Voice," RingCentral, Inc., pp. 1-1 (2018).
"CRM Integration," RingCentral, Inc., pp. 1-2 (2018).
"3X Customize Solutions with Mr.VoIP Universal Tool," Mr VoIP, pp. 1-4 (2018).
"Amazon Connect CTI Adapter: CTI Contact Center IVR ACD Call Recording," Amazon Web Services, pp. 1-1 (Sep. 20, 2018).
"Amazon Connect and Salesforce Integration", Amazon Web Services, Inc., pp. 1-3 (2018).
Roopika, et al., "Real Time Communications Between Mobile and Web Browser," International Journal of Advance Research, Ideas, and Innovations in Technology, vol. 4, Issue 3, pp. 1286-1289 (2018).
Rudkowski, Marc, "Enabling Amazon Connect with Salesforce Service Cloud and Sales Cloud," Amazon, pp. 1-11 (Sep. 12, 2017).
"Sonus Enables WebRTC & SIP/PSTN/IMS Integration," Ribbon Communications Operating Company Inc., pp. 1-4 (Mar. 16, 2015).
"When WebRTC and SIP Worlds Intersect . . . ," Ribbon Communications Operating Company Inc., pp. 1-4 (Jul. 22, 2013).
"Flowroute Connects FreeSWITCH WebRTC Platform to the World," Flowroute, pp. 1-3 (Jun. 24, 2013).
Pleasant, Robbie "FreeSWITCH Selects Flowroute for PSTN-WebRTC Interoperability," WebRTC World, Technology Marketing Corp., pp. 1-10 (Jun. 24, 2013).
Kelly, Brent "WebRTC Integration with Enterprise and Public Communications Infrastructure," No Jitter, pp. 1-7 (Jun. 5, 2013).
Non-Final Office Action for U.S. Appl. No. 16/453,952 (dated Dec. 10, 2020).
Communication pursuant to Article 94(3) EPC for European Patent Application Serial No. 18 706 337.5 (dated Dec. 1, 2020).
Notice of Allowance and Fee(s) Due and Examiner-Initiated Interview Summary for U.S. Appl. No. 16/453,952 (dated Apr. 15, 2021).
Examination Report for Indian Patent Application Serial No. 201947040531 (dated Apr. 20, 2021).
Non-Final Office Action for Japanese Application Serial No. 2019-553236 (dated Aug. 17, 2021).
Decision to grant a European patent pursuant to Article 97(1) EPC for European Patent Application Serial No. 187706337.5 (dated Jun. 2, 2022).

(56) References Cited

OTHER PUBLICATIONS

Examination Report for Indian Patent Application Serial No. 202147022470 (dated Mar. 1, 2022).

* cited by examiner

| DATA ENTRY | DESCRIPTION |
|---|---|
| omc: | |
| entities: | |
| - entity: Account | The entity generated from swagger. Must be same as class name |
| alias: account | The name typically used in the FList. For example, customer swagger is nameinfo in FList, so for the entity Customer, the alias would be nameinfo. |
| description: The account's detail | The entity description. Optional, but recommended. |
| FListId: FldAcctinfo | The FList ID for the entity |
| fields: | |
| - field: accountNumber | The field from the entity generated from swagger. If there is no representation of the field in the swagger schema, then we leave blank and the generic framework will use the FListId. |
| FListId: FldAccountNo | The FList ID for the field |
| - field: id | The field from the entity generated from swagger. |
| FListId: FldPoid | The FList ID for the field |
| FListDefault: true | Is the field present by default in the request FList? Example, for createAccount, the POID is default in the request FList. |
| FListDefaultValue: plan | If the field is default for the request FList, what should be its value, if it is not passed in by the incoming REST payload? In this example, the default value is plan, so the PIN_FLD_POID will be: POID [0] 0.0.0.1 /plan -1 0. |
| FListDefaultRoot: true | The location of the field in the FList. For example, when creating an account, the plan POID may be located at the root level, along with PIN_FLD_ACCTINFO. |
| - field: | This field is empty because the FldFlags is default for the request FList, but it is not defined in the entity generated from swagger. |
| FListId: FldFlags | The FList ID for the field |
| FListDefault: true | Is the field present by default in the request FList? Example, for createAccount, the FLD_FLAGS is default in the request FList. |
| FListDefaultValue: 0 | If the field is default for the request FList, what should be its value, if it is not passed in by the incoming REST payload? In this example, the default value is 0, so the PIN_FLD_FLAGS will be: INT [0] 0. If we don't give a value, but the attribute FlistDefaultValue is present, then the value will be null. Example: PIN_FLD_BAL_INFO ARRAY [0] NULL. |

| DATA ENTRY | DESCRIPTION |
|---|---|
| - field: type | The field from the entity generated from swagger. |
| FListId: FldBusinessType | The FList ID for the field |
| validation: [mandatory] | When converting or marshalling a JSON document to FList, the given validation will be performed on the value. In this example, the type is mandatory, so a value is required. |
| - field: contacts | The field from the entity generated from swagger. In this example, it is a list of contacts. |
| FListId: FldNameInfo | The FList ID for the field |
| entity: Contact | This indicates that the field is an entity. The definition of the entity is defined elsewhere in the template. |
| FListRoot: true | This indicates whether the field is at root level in the request FList or a child of the current entity. |
| - field: locale | The field from the entity generated from swagger. In this example, it is a list of locale. |
| FListId: FldLocale | The FList ID for the field |
| wrapInAnArray: FldLocales | This specify that we want the field to be inside an array. The array type will be the field name, e.g. FldLocales. Example:<br>0 PIN_FLD_LOCALES ARRAY [1] allocated 1, used 1<br>1 PIN_FLD_LOCALE STR [0] "en_US" |
| arrayStartAtOne: true | For some array fields, the array starts at 0 and for some it starts at 1. We tried to find logic behind this, but it seems to be different from one entity to another. So, we need to specify if the array starts at zero or one. For example, this one start at zero: "0 PIN_FLD_BAL_INFO ARRAY [0]" and this one starts at one: "0 PIN_FLD_NAMEINFO ARRAY [1]" |
| FListDefault: true | Is the field present by default in the request FList? Example, for createAccount, the FLD_LOCALE is default in the request FList, but has an array as parent (see wrapInAnArray attribute above) |
| FListDefaultValue: String(en_US) | If the field is default for the request FList, what should be its value, if it is not passed in by the incoming REST payload? In this example, we want to give the the default value en_US, so any text that we supply inside String(), will be take for the default string value. In this example, the locale will be PIN_FLD_LOCALE will be: STR [0] "en_US". If we don't give a value, but the attribute FListDefaultValue is present, then the value will be null. Example: STR [0] "en_US" NULL - this would fail in OPCODEs because the locales is mandatory. |
| FListDefaultRoot: true | The location of the field in the FList. For example, if true, when creating an locale, the array of locale is at the root level of the account. If false, then the array of locale would be a child of account. |
| - field: securityQuestion | The field from the entity generated from swagger. |
| FListId: FldAccessCode1 | The FList ID for the field |
| - field: securityAnswer | The field from the entity generated from swagger. |
| FListId: FldAccessCode2 | The FList ID for the field |

| FLISTID TYPE | FLISTID TYPE EXAMPLE(S) | DATA ENTITY MAPPING TYPE | DATA ENTITY MAPPING EXAMPLE(S) |
|---|---|---|---|
| IntField | FldFlags, FldPayType | int | - field:<br>FListId: FldFlags<br>FListDefault: true<br>FListDefaultValue: 0 |
| PoidField | FldPoid | string | - field: id<br>FListId: FldPoid<br>FListDefault: true<br>FListDefaultValue: plan |
| StrField | FldName | method call on the entity. Ex:getName | - field: name<br>FListId: FldName<br>FListDefault: true<br>FListDefaultValue: getName |
| StrField | FldContactType, FldLocale | string copied from inside the () of String() | - field:<br>FListId: FldContactType<br>FListDefault: true<br>FListDefaultValue: String(This is a Contact note) |
| StrField | FldAccountNo | Generate 10 digit random number with optional prefix and seperator. Ex:<br>generateRandomNumber --> 1234567890<br>generateRandomNumber(ABC) --> ABC1234567890<br>generateRandomNumber(ABC,-) --> ABC-1234567890 | - field:<br>FListId: FldAccountNo<br>FListDefault: true<br>FListDefaultValue: generateRandomNumber |
| StrField | FldBillinfold | Generated random string in UUIS format | - field:<br>FListId: FldBillinfold<br>FListDefault: true<br>FListDefaultValue: generateRandomUUIS |
| ArrayField | FldBalInfo | null | - field:<br>FListId: FldBalInfo<br>FListDefault: true<br>FListDefaultValue: |

```json
{
  "accountNumber": "a1000alain",
  "type": "CONSUMER",
  "currency": "USD",
  "securityQuestion": "My dog's name",
  "securityAnswer": "Fido",
  "contacts": [
    {
      "firstName": "Alain",
      "lastName": "Smith",
      "email": "userName@example.com",
      "address": {
        "street": "1234, Main Street",
        "city": "New York",
        "state": "NY",
        "postalCode": "10004",
        "country": "USA",
        "geoCode": "QT-211"
      },
      "phones": [
        {
          "type": "HOME",
          "number": "214-555-1212"
        },
        {
          "type": "WORK",
          "number": "423-653-0331"
        }
      ]
    }
  ],
  "billingPreferences": [
    {
      "name": "Bill Unit-1",
      "accountingType": "BALANCEFORWARD",
      "billingFrequency": "MONTHLY"
    },
    {
      "name": "Bill Unit-2",
      "accountingType": "BALANCEFORWARD",
      "billingFrequency": "MONTHLY"
    }
  ]
}
```

0 PIN_FLD_TXN_FLAGS            INT   [0] 2
0 PIN_FLD_POID                 POID  [0] 0.0.0.1 /null -1 0
0 PIN_FLD_BILLINFO             ARRAY [1] allocated 6, used 6
1     PIN_FLD_POID             POID  [0] 0.0.0.1 /billinfo -1 0
1     PIN_FLD_BILLINFO_ID      STR   [0] "Bill Unit-1"
1     PIN_FLD_BILL_WHEN        INT   [0] 1
1     PIN_FLD_ACTG_TYPE        ENUM  [0] 2
1     PIN_FLD_PAY_TYPE         ENUM  [0] 0
1     PIN_FLD_BAL_INFO         ARRAY [0] NULL
0 PIN_FLD_BILLINFO             ARRAY [2] allocated 6, used 6
1     PIN_FLD_POID             POID  [0] 0.0.0.1 /billinfo -1 0
1     PIN_FLD_BILLINFO_ID      STR   [0] "Bill Unit-2"
1     PIN_FLD_BILL_WHEN        INT   [0] 1
1     PIN_FLD_ACTG_TYPE        ENUM  [0] 2
1     PIN_FLD_PAY_TYPE         ENUM  [0] 0
1     PIN_FLD_BAL_INFO         ARRAY [0] NULL
0 PIN_FLD_ACCTINFO             ARRAY [0] allocated 7, used 7
1     PIN_FLD_ACCOUNT_NO       STR   [0] "a1000alain"
1     PIN_FLD_ACCESS_CODE2     STR   [0] "Fido"
1     PIN_FLD_ACCESS_CODE1     STR   [0] "My dog\'s name"
1     PIN_FLD_POID             POID  [0] 0.0.0.1 /account -1 0
1     PIN_FLD_BAL_INFO         ARRAY [0] NULL
1     PIN_FLD_CURRENCY         INT   [0] 840
1     PIN_FLD_BUSINESS_TYPE    ENUM  [0] 1
0 PIN_FLD_PROGRAM_NAME         STR   [0] "REST API"
0 PIN_FLD_LOCALES              ARRAY [1] allocated 1, used 1
1     PIN_FLD_LOCALE           STR   [0] "en_US"
0 PIN_FLD_NAMEINFO             ARRAY [1] allocated 12, used 12
1     PIN_FLD_POID             POID  [0] 0.0.0.1 /address -1 0
1     PIN_FLD_LAST_NAME        STR   [0] "Smith"
1     PIN_FLD_FIRST_NAME       STR   [0] "Alain"
1     PIN_FLD_CONTACT_TYPE     STR   [0] "primary"
1     PIN_FLD_GEOCODE          STR   [0] "QT-211"
1     PIN_FLD_PHONES           ARRAY [0] allocated 3, used 3
2         PIN_FLD_PHONE        STR   [0] "214-555-1212"
2         PIN_FLD_POID         POID  [0] 0.0.0.1 /phone -1 0
2         PIN_FLD_TYPE         ENUM  [0] 1
1     PIN_FLD_PHONES           ARRAY [1] allocated 3, used 3
2         PIN_FLD_PHONE        STR   [0] "423-653-0331"
2         PIN_FLD_POID         POID  [0] 0.0.0.1 /phone -1 0
2         PIN_FLD_TYPE         ENUM  [0] 2
1     PIN_FLD_EMAIL_ADDR       STR   [0] "userName@example.com"
1     PIN_FLD_COUNTRY          STR   [0] "USA"
1     PIN_FLD_ZIP              STR   [0] "10004"
1     PIN_FLD_STATE            STR   [0] "NY"
1     PIN_FLD_CITY             STR   [0] "New York"
1     PIN_FLD_ADDRESS          STR   [0] "1234, Main Street"
0 PIN_FLD_FLAGS                INT   [0] 0
```

FIG. 5

```
0 PIN_FLD_LOCALES                    ARRAY [1]  allocated 1, used 1
1     PIN_FLD_LOCALE                 STR   [0]  "en_US"
0 PIN_FLD_ACCOUNT_OBJ                POID  [0]  0.0.0.1 /account 78663 0
0 PIN_FLD_HOST                       ARRAY [1]  allocated 2, used 2
1     PIN_FLD_HOSTNAME               STR   [0]  "XXX.XXX.XXX.XXX"
1     PIN_FLD_TYPE                   ENUM  [0]  1
0 PIN_FLD_HOST                       ARRAY [2]  allocated 2, used 2
1     PIN_FLD_HOSTNAME               STR   [0]  "XXX.XXX.XXX.XXX"
1     PIN_FLD_TYPE                   ENUM  [0]  1
0 PIN_FLD_HOST                       ARRAY [3]  allocated 3, used 3
1     PIN_FLD_HOSTNAME               STR   [0]  "XXXXXXXXX.XXX"
1     PIN_FLD_TYPE                   ENUM  [0]  2
1     PIN_FLD_PORT                   INT   [0]  0
0 PIN_FLD_HOST                       ARRAY [4]  allocated 2, used 2
1     PIN_FLD_HOSTNAME               STR   [0]  "XXXX.XXX"
1     PIN_FLD_TYPE                   ENUM  [0]  3
0 PIN_FLD_HOST                       ARRAY [5]  allocated 2, used 2
1     PIN_FLD_HOSTNAME               STR   [0]  "XXXX.XXX"
1     PIN_FLD_TYPE                   ENUM  [0]  4
0 PIN_FLD_POID                       POID  [0]  0.0.0.1 /plan -1 0
0 PIN_FLD_GROUP_INFO                 SUBSTRUCT  allocated 0, used 0
0 PIN_FLD_FLAGS                      INT   [0]  0
0 PIN_FLD_NAMEINFO                   ARRAY [1]  allocated 16, used 16
1     PIN_FLD_TITLE                  STR   [0]  ""
1     PIN_FLD_LAST_NAME              STR   [0]  "Smith"
1     PIN_FLD_MIDDLE_NAME            STR   [0]  ""
1     PIN_FLD_FIRST_NAME             STR   [0]  "Alain"
1     PIN_FLD_SALUTATION             STR   [0]  ""
1     PIN_FLD_CONTACT_TYPE           STR   [0]  "This is a Contact note"
1     PIN_FLD_PHONES                 ARRAY [0]  allocated 3, used 3
2         PIN_FLD_PHONE              STR   [0]  "423-653-0331"
2         PIN_FLD_POID               POID  [0]  0.0.0.1 /phone -1 0
2         PIN_FLD_TYPE               ENUM  [0]  173
1     PIN_FLD_EMAIL_ADDR             STR   [0]  "userName@example.com"
1     PIN_FLD_COUNTRY                STR   [0]  "USA"
1     PIN_FLD_ZIP                    STR   [0]  "10004"
1     PIN_FLD_STATE                  STR   [0]  "NY"
1     PIN_FLD_CANON_COUNTRY          STR   [0]  "US"
1     PIN_FLD_CITY                   STR   [0]  "New York"
1     PIN_FLD_ADDRESS                STR   [0]  "1234, Main Street"
1     PIN_FLD_ELEMENT_ID             INT   [0]  1
1     PIN_FLD_COMPANY                STR   [0]  ""
0 PIN_FLD_HTTP_URL                   STR   [0]  "XXXXXXXXXXXXXX"
0 PIN_FLD_SUPPORT_PHONE              STR   [0]  "XXXXXXXXXXXXXX"
0 PIN_FLD_BAL_INFO                   ARRAY [0]  allocated 3, used 3
1     PIN_FLD_BILLINFO_OBJ           POID  [0]  0.0.0.1 /billinfo 80711 0
1     PIN_FLD_NAME                   STR   [0]  "Default Balance Group"
1     PIN_FLD_POID                   POID  [0]  0.0.0.1 /balance_group 79047 0
0 PIN_FLD_ACCTINFO                   ARRAY [0]  allocated 6, used 6
1     PIN_FLD_ACCOUNT_NO             STR   [0]  "a1000alain"
1     PIN_FLD_NAME                   STR   [0]  "Alain Smith"
1     PIN_FLD_POID                   POID  [0]  0.0.0.1 /account -1 0
1     PIN_FLD_BAL_INFO               ARRAY [0]  NULL
1     PIN_FLD_CURRENCY               INT   [0]  840
1     PIN_FLD_BUSINESS_TYPE          ENUM  [0]  1
0 PIN_FLD_END_T                      TSTAMP[0]  (1515638325) 10/01/2018 18:38:45:000 PM
0 PIN_FLD_START_T                    TSTAMP[0]  (1515638325) 10/01/2018 18:38:45:000 PM
0 PIN_FLD_BILLINFO                   ARRAY [0]  allocated 8, used 8
1     PIN_FLD_BAL_GRP_OBJ            POID  [0]  0.0.0.1 /balance_group 81095 0
1     PIN_FLD_POID                   POID  [0]  0.0.0.1 /billinfo 80711 0
1     PIN_FLD_EFFECTIVE_T            TSTAMP[0]  (1515638325) 10/01/2018 18:38:45:000 PM
1     PIN_FLD_BILLINFO_ID            STR   [0]  "Default Bill"
1     PIN_FLD_CURRENCY_SECONDARY     INT   [0]  0
1     PIN_FLD_PAY_TYPE               ENUM  [0]  0
1     PIN_FLD_CURRENCY               INT   [0]  840
1     PIN_FLD_PAYINFO_OBJ            POID  [0]  NULL
```

FIG. 6

```
{
    "id": "3319250",
    "accountNumber": "a1000alain",
    "type": "consumer",
    "parentAccountNumber": "a1000alain",
    "currency": "USD",
    "securityQuestion": "My dog's name",
    "securityAnswer": "Fido",
    "locale": "en_US",
    "contacts": {
        {
            "id": "33193501",
            "firstName": "Alain",
            "lastName": "Smith",
            "type": "primary",
            "email": "userName@example.com",
            "address": {
                "street": "1234, Main Street",
                "city": "New York",
                "state": "NY",
                "postalCode": "10004",
                "country": "USA",
                "geoCode": "QT-211"
            },
            "phones": [
                {
                    "type": "home",
                    "number": "214-555-1212"
                },
                {
                    "type": "work",
                    "number": "423-653-8331"
                }
            ]
        }
    },
    "billingPreferences": {
        {
            "links": [
                {
                    "rel": "self",
                    "href": "http://slc09cdb.us.oracle.com:8080/cmc/v1.0/billingPreferences/3321938"
                }
            ]
        },
        {
            "links": [
                {
                    "rel": "self",
                    "href": "http://slc09cdb.us.oracle.com:8080/cmc/v1.0/billingPreferences/3317810"
                }
            ]
        }
    },
    "links": {
        {
            "rel": "self",
            "href": "http://slc09cdb.us.oracle.com:8080/cmc/v1.0/accounts/3319250"
        }
    }
}
```

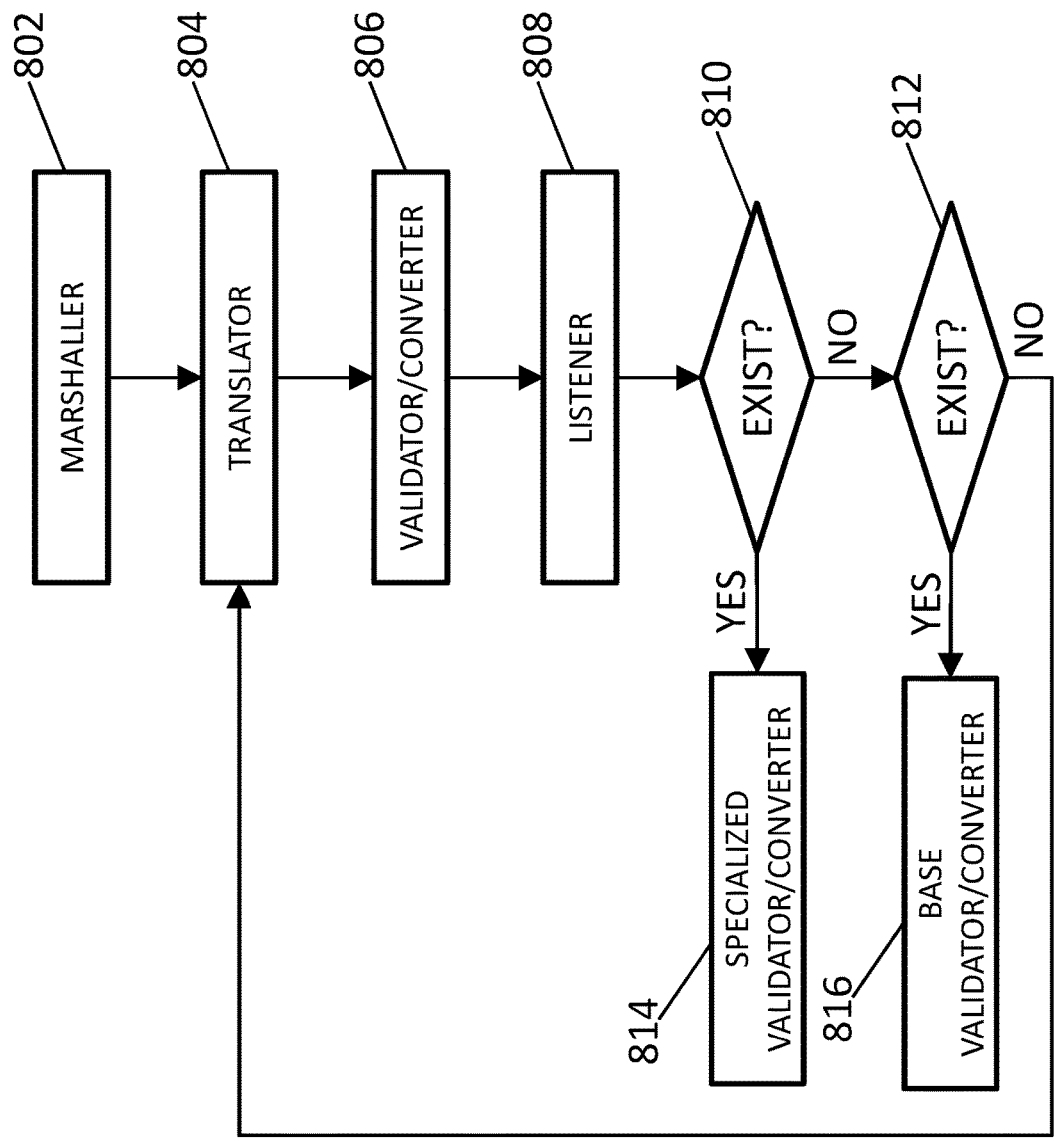

METHODS, SYSTEMS, AND COMPUTER READABLE MEDIA FOR DATA TRANSLATION USING A REPRESENTATIONAL STATE TRANSFER (REST) APPLICATION PROGRAMMING INTERFACE (API)

TECHNICAL FIELD

The subject matter described herein relates to network communications. More specifically, the subject matter relates to methods, systems, and computer readable media for data translation using a representational state transfer (REST) application programming interface (API).

BACKGROUND

Some computer systems use multiple data formats and/or protocols to communicate. For example, components in a cloud-based computer system may communicate using internet protocol (IP), hypertext transfer protocol (HTTP), and/or other protocols. Further, to allow communications between various entities, one or more application programming interfaces (APIs) may be supported to provide a standardized way for communications.

A representational state transfer (REST) API is one type of API for providing web services. For example, a REST API may allow communications between two systems via HTTP. In this example, an HTTP request containing a payload is sent to a uniform resource identifier (URI), e.g., uniform resource locator (URL), and, in response, an HTTP response containing a payload may be provided to the requester. However, some systems or components therein may be unable to process the payloads provided via a REST API since the data may be stored unsupported format.

SUMMARY

Methods, systems, and computer readable media for data translation using a representational state transfer (REST) application programming interface (API) are disclosed. According to one method, the method comprises: receiving, from a client via a REST API, input in a first format; converting, using predetermined metadata, the input in the first format into input in a second format; sending the input in the second format to a legacy system for performing an operation using the input in the second format; receiving, from the legacy system, output in the second format, wherein the output is based at least in part on the operation performed using the input in the second format; converting, using the predetermined metadata, the output in the second format into output in the first format; and sending, to the client via the REST API, the output in the first format.

According to one system, the system includes at least one processor and a server implemented using the at least one processor. The server is configured for: receiving, from a client via a REST API, input in a first format; converting, using predetermined metadata, the input in the first format into input in a second format; sending the input in the second format to a legacy system for performing an operation using the input in the second format; receiving, from the legacy system, output in the second format, wherein the output is based at least in part on the operation performed using the input in the second format; converting, using the predetermined metadata, the output in the second format into output in the first format; and sending, to the client via the REST API, the output in the first format.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory. As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIGS. 2A-2B depict example metadata for validating and/or converting between data formats;

FIG. 3 depicts example default values data related to converting between data formats;

FIG. 4 depicts example request data in a JavaScript object notation (JSON) data format;

FIG. 5 depicts example request data in a field list (FList) data format;

FIG. 6 depicts example output in a FList data format;

FIG. 7 depicts example output in a JSON data format;

FIG. 8 is a diagram illustrating an example data translation process; and

DETAILED DESCRIPTION

Figure 1:
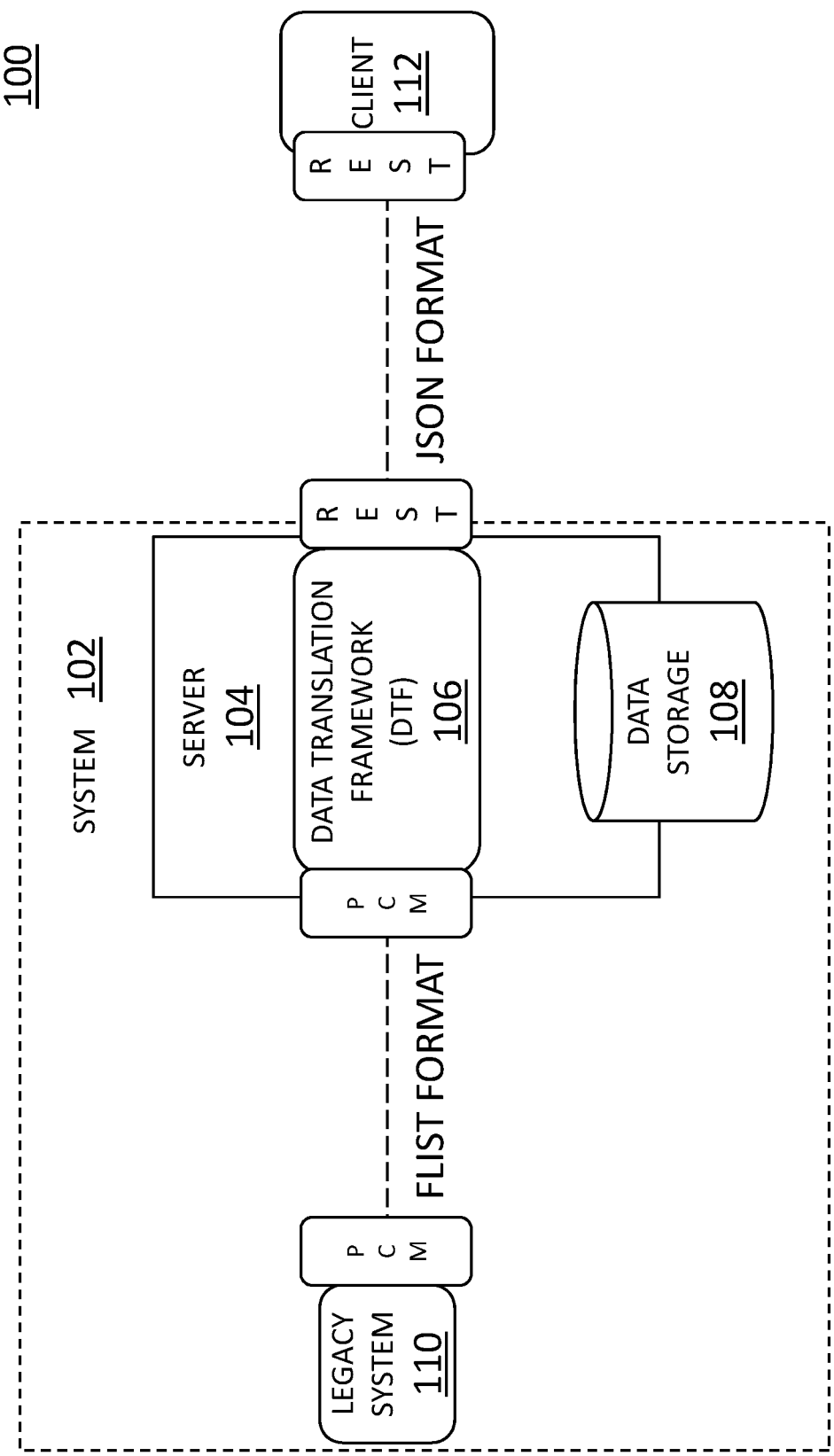
FIG. 1 is a diagram illustrating an example environment for data translation using a representational state transfer (REST) application programming interface (API)

The subject matter described herein relates to methods, systems, and computer readable media for data translation using a representational state transfer (REST) application programming interface (API). Some systems, e.g., legacy or older systems, that provide a plurality of important services may communicate using one or more proprietary or legacy APIs or protocols. Since such a system can be very expensive and time consuming to replace, it is very likely that eventually newer systems will need to interact with the older system and the newer system may not be configured for such communications. For example, a financial institution or other enterprise may use a legacy system (e.g., a database, a storage system, or a back-end) initially designed in the 1980s. In this example, the same enterprise may also use a modern front-end or client (e.g., web-based user interface) that needs to communicate with the legacy system or component. Continuing with this example, if the legacy system is a billing and revenue management (BRM) system that uses a legacy API and/or data format, e.g., a field list (FList)

format, when processing information in various service domains (e.g., Account, Subscription and Bill), the FList format may not be usable with the modern client. As such, to be usable by the modern client, the data needs to be transformed to a compatible data format, e.g., a JSON format.

One approach for converting a legacy format into a non-legacy format may involving hand-coding the conversion logic into the legacy system or an intermediary gateway node. For example, such an approach may involve manually coding functions for creating, updating, and getting each type of a plurality of data objects, e.g., account data objects, subscription data objects, payment profile data objects, and billing data objects. However, such an approach can lead to duplicate code, excessive test effort, error prone behavior, and provide unpredictable performance results.

In accordance with some aspects of the subject matter described herein, techniques, methods, or mechanisms are disclosed for a metadata-based data translation framework usable for converting one data format to another data format using metadata, e.g., a mapping template provided by an operator at or before system run-time. For example, an example data translation algorithm or a related framework may efficiently convert FList data to JSON data or vice versa by defining a simple metadata file that indicates how various data portions should be mapped or converted. Further, such a framework can provide for backward compatibility and improve extensibility, e.g., by executing compatibility tests to determine whether metadata (e.g., a mapping template) needs to be modified, e.g., if a new field is added to the service domain, then a new field may be added to a JSON/FLIST mapping template for correct conversion or translation.

In accordance with some aspects of the subject matter described herein, techniques, methods, or mechanisms are disclosed for a REST based data translation framework. For example, an example REST based data translation framework may utilize metadata and a REST API such that all REST calls (e.g., HTTP requests) are processed using the data framework or a related data translation algorithm. In this example, since REST calls are processed by the same framework, performance issues and benefits can be seen for every service domain entity and without compromising data integrity and performance.

In accordance with some aspects of the subject matter described herein, techniques, methods, or mechanisms are disclosed for a data translation framework using reflection programming techniques. For example, an example data translation system may generate conversion or translation logic at or near run-time based on metadata. In this example, assuming the logic is written in Java or another object-oriented programming language, data translation system may use the metadata to generate code (e.g., multiple classes, objects, interfaces, and related logic) for converting and/or marshalling data from one format to another format and vice versa.

Advantageously, in accordance with some aspects of the subject matter described herein, by using metadata and a REST API, a data translation framework can efficiently convert between data formats such that older systems can communicate with newer clients or components. Further, by using metadata to derive conversion or translation logic via reflection programming techniques, code can be generated at runtime and can define logic (e.g., including classes and/or instances of classes or other programming constructs) for transforming data from one format to another format.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example environment 100 for REST based data conversion. Environment 100 may represent one or more communications networks. For example, environment 100 may represent an enterprise network and/or the Internet containing various network nodes, computing platforms, servers, or devices. In this example, environment 100 may be usable for sending and receiving communications, e.g., providing content or services to nodes and/or end users.

Referring to FIG. 1, environment 100 may include a computing system 102. System 102 may represent one or more suitable computing platforms or devices for performing one or more functions or services, e.g., billing and revenue management (BRM) services or customer relationship management (CRM) services. In some embodiments, system 102 may be in a single distinct geographic location and communicate via an internal communications network and/or may include components (e.g., server 104 or legacy system 110) that are in geographically diverse locations and may communicate via an external communications network. For example, system 102 may be deployed in a proprietary cloud network managed by a service provider and accessible to subscribed customers via the internet. In another example, system 102 may be implemented using one or more servers in a server room maintained by an enterprise or may be implemented using cloud-based resources in one or more data centers maintained by a third party, e.g., a cloud service provider.

System 102 may include or interact with server 104 and legacy system 110. Server 104 may represent any suitable entity or entities for facilitating communications among various entities. For example, server 104 may include one or more processors, memory, and logic configured for facilitating communications between entities external to system 102 (e.g., client 112) and system 102 or related entities (e.g., legacy system 110).

In some embodiments, server 104 may include functionality for communicating with legacy system 110 or another entity via a legacy or proprietary API (e.g., a portal communications module (PCM) API or OPCODE API used by an BRM or a cloud monetarization system) and/or other APIs or protocols. For example, a PCM API may involve service or function calls that utilize data in a FList format. In this example, server 104 or a related entity may send, to legacy system 110 via a PCM API, a request indicating an operation to perform and FList data. Continuing with this example, after processing at legacy system 110, server 104 or a related entity may receive FList formatted output from legacy system 110 via the PCM API.

Legacy system 110 may represent any suitable entity or entities (e.g., a virtual machine, software, or a physical device) for performing a service or function and may use a protocol and/or data format that is not supported by all clients, e.g., client 112. For example, legacy system 110 may include software or related logic for storing, managing, or processing financial data and may communicate via an API that is proprietary, legacy, or not supported by client 112. In some embodiments, legacy system 110 may include functionality for communicating with server 104 or other entities using a PCM API or other APIs and protocols.

In some embodiments, server 104 may include functionality for communicating with client 112 or another entity via a REST API and/or other APIs or protocols. For example, a REST API may utilize requests and responses via HTTP messages. In this example, server 104 or a related entity may receive, from client 112 via a REST API, JSON formatted data that is incompatible with legacy system 110 and may convert or facilitate conversion of the JSON formatted data to a FList format that is compatible with legacy system 110. Continuing with this example, after receiving FList formatted output from legacy system 110, server 104 or a related entity may convert or facilitate conversion of the FList formatted output to JSON formatted output that is compatible with client 112 and then may send a REST-based HTTP response that includes the JSON formatted output to client 112.

Client 112 may represent any suitable entity or entities (e.g., a virtual machine, software, or a physical device) for interacting with system 102, server 104, and/or a related entity. For example, client 112 may include a user interface (UI) application (e.g., a web-based UI that acts as a user front-end or portal) or other software (e.g., financial software or a business application) that uses data stored or managed by system 102 or a related service, e.g., legacy system 110. In some embodiments, client 112 may include functionality for communicating with server 104 or other entities using a REST API and/or other APIs and protocols.

Server 104 may interact with a data translation framework (DTF) 106. In some embodiments, DTF 106 may include components that are separate from and/or components that are integrated with server 104. DTF 106 may represent any suitable entity or entities (e.g., software executing on a processor, an application-specific integrated circuit (ASIC), and/or a field-programmable gate array (FPGA)) for performing aspects related to data conversion, data translation, or related functionality. For example, server 104 may receive JSON data from a REST API message (e.g., originating from client 112) and DTF 106 may be configured to convert or translate the JSON data into corresponding FList data that can be processed by system 102 or a related entity, e.g., legacy system 110. In another example, server 104 may receive FList data originating from legacy system 110 in response to a call or request from client 112 to system 102 and DTF 106 may be configured to convert or translate the FList data into corresponding JSON data that can be processed by client 112 or a related service, e.g., a web UI or client application.

In some embodiments, DTF 106 or related modules may manage conversion rules and metadata used in performing data conversion or translations. For example, an operator (e.g., a software or solution architect) or other entity (e.g., management system) may communicate with server 104 or DTF 106 and may provide one or more metadata files, templates, or other information for performing data conversion or related data processing. In this example, server 104 or DTF 106 may process and store the received data for subsequent use.

In some embodiments, DTF 106 or related modules may manage validation rules and metadata used in performing data validation. For example, an operator (e.g., a software or solution architect) or other entity (e.g., management system) may communicate with server 104 or DTF 106 and may provide one or more metadata files, templates, or other information for performing data validation or related data processing. In this example, server 104 or DTF 106 may process and store the received data for subsequent use.

Data storage 108 may represent any suitable entity (e.g., a non-transitory computer readable medium, embedded memory, or a memory device) for storing data associated with handling communications and/or data conversions. Data storage 108 may store logic and/or data for utilizing various APIs and/or protocols for communications. For example, data storage 108 may store metadata and/or related logic (e.g., default values, converter logic, format templates, etc.) for converting data from one format to another format (e.g., from JSON or XML to FList) and vice versa (e.g., from FList to JSON or XML). In some embodiments, data storage 108 may be accessible by server 104, DTF 106 and other entities and may be usable for various purposes. In some embodiments, data storage 108 may be located on a single device or computing platform or may be distributed across multiple devices or computing platforms.

In some embodiments, server 104, DTF 106, or legacy system 110 may be a distinct message processing module of a distributed computing platform, a computing blade in a blade-based distributed computing platform, a processing core element associated with a single or multi-core computing device, or a virtual node or machine instantiated on one or more physical computing devices.

In some embodiments, server 104, DTF 106, and/or another entity may utilize one or more programming languages for performing data translation or conversion. In such embodiments, server 104, DTF 106, and/or another entity may generate or configure a marshaller (e.g., a software interface or related code) for marshalling data from a first format to a second format and for unmarshalling data from a second format. In some embodiments, a marshaller may include one or more functions that when called can convert an entity, e.g., JSON data, to corresponding FList data and vice versa. In some embodiments, two types of marshal/unmarshall entities may be used: one type is in the context of an entity (e.g., create Account, get Account, update Account), the other type is in the context of a search (e.g., find Account, find Subscription).

In some embodiments, server 104, DTF 106, and/or another entity may create and/or call a marshaller to get, create, update, or modify an entity. For example, assume a create account request, DTF 106 may create a Marshaller object instance from a MarshallerFactory object instance. Example code to create a Marshaller for creating an account is: Marshaller=MarshallerFactory.getMarshaller(account, ActionEnum.CREATE).

In the example code, an account is a Java object representation a JSON document and an ActionEnum object instance is defined as 'CREATE' based on the create action requested.

In some embodiments, marshalling from JSON data to FList data (and unmarshalling from FList data to JSON data) may differ based on the action requested. In some embodiments, possible types for an ActionEnum object instance include: CREATE, GET, UPDATE and MODIFY and may correspond or relate to their respective HTTP methods: CREATE, GET, PUT and PATCH.

In some embodiments, after initializing a Marshaller object instance, server 104, DTF 106, and/or another entity may call a marshall function for converting a JSON entity to FList data. Example code for calling a marshall function using a Marshaller object instance is:

FList inputFList=marshaller.marshall( ).

In some embodiments, after marshalling a JSON entity to FList data, server 104, DTF 106, and/or another entity may invoke an operation at or by legacy system 110. Example code for invoking a create customer operation at or by legacy system 110 is:

FList outputFList=omcService.invokeOperation(PortalOp.CUST_COMMIT_CUSTOMER, inputFList).

In some embodiments, after receiving FList formatted output from legacy system 110 in response to a commit operation being performed by or at legacy system 110, server 104, DTF 106, and/or another entity may call an unmarshall function for converting the FList formatted output to a JSON entity. Example code for calling an unmarshall function using a Marshaller object instance is:

Account retAccount=(Account) marshaller.unmarshall-FromFList(outputFList).

In some embodiments, server 104, DTF 106, and/or another entity may create and/or call a marshaller to find one or more entities, e.g., a REST API search. Example code to create a Marshaller object instance for a search is:

Marshaller=MarshallerFactory.getMarshaller(account, ActionEnum.GET).

In the example code, an ActionEnum object instance is defined as 'GET'. In some embodiments, an ActionEnum object instance may not matter for searches. In such embodiments, for consistency, ActionEnum.GET or another ActionEnum type may be used when requesting a search.

In some embodiments, after initializing a Marshaller object instance for a search, server 104, DTF 106, and/or another entity may generate a JSON search entity (e.g., a rest.model.Search entity). Example code for building a search entity is:

```
    int flags;          // 0 or 256
    List<SearchItem> args = new ArrayList<>( );    // "Poid", "0.0.0.1
/strings –1 0" | "DOMAIN", "Reason codes%"
    String template;    // "select X from /strings where F1 = V1 and F2
like V2"
```

In some embodiments, after building or creating a search entity, server 104, DTF 106, and/or another entity may call a marshall function for converting a JSON search entity (e.g., a rest.model.Search entity) to FList data. Example code for calling a marshall function using a Marshaller object instance is:

FList inputFList=marshaller. marshall(search).

In some embodiments, after marshalling a JSON entity to FList data, server 104, DTF 106, and/or another entity may invoke an operation at or by legacy system 110. Example code for invoking a search operation at or by legacy system 110 is:

FList outputFList=omcService.invokeOperation(Porta-lOp.SEARCH, inputFList). In some embodiments, after receiving FList formatted output from legacy system 110 in response to a search operation being performed by or at legacy system 110, server 104, DTF 106, and/or another entity may call an unmarshall function for converting a FList data to a JSON entity. In some embodiments, for searches, an unmarshall function may need as input an entity type and the FList data to unmarshall. Example code for calling an unmarshall function using a Marshaller object instance to generate BillingPreference entity is:

List<BillingPreference>billingPreferencesList= (List<BillingPreference>) marshaller.unmarshallResults ("BillingPreference", outputFList);

In some embodiments, server 104, DTF 106, and/or another entity may call and/or use a converter (e.g., software and/or conversion rules) for converting fields, data, or types of data. For example, when DTF 106 calls a marshaller to marshall/unmarshall an entity, one or more converters may be used for converting various data portions (e.g., fields or FListIDs defined in the metadata or mapping template).

In some embodiments, a converter may convert data from or to a different type. For example, assume a JSON entity includes a field 'Status' with a value of 'Active' but that FList requires a numeric status, then DTF 106 may need to use a status related converter to convert a status value of 'Active' to '1001' when converting to a FList format.

In some embodiments, a converter may change a field name or related field identifier (e.g., FListID) based on an action performed (GET vs CREATE) or based on a value of a field. For example, depending on a type of product or entity, a JSON field 'Name' may be converted to a different FListID, e.g., a field 'Name' for a 'charge' product may be converted to a FListID 'FLDProduct', while a field 'Name' for a 'discount' product may be converted to a FListID 'FLDDiscount'.

In some embodiments, server 104, DTF 106, and/or another entity may create and use specialized or customized converters. In such embodiments, server 104, DTF 106, and/or another entity may use metadata (e.g., a mapping template) for creating one or more converters. For example, if fields of a given JSON entity require specialized conversion (e.g., different than fields of another JSON entity), then a specialized converter for the given JSON entity may be defined. In this example, the specialized converter may be a class created in a software package (e.g., a REST.converter package) and may have the class name '<Entity>Converter', where <Entity> is the name of the JSON entity.

For example, for an 'AccountStatus' entity, DTF 106 may convert a numeric status value to an alpha status value using a specialized converter. In this example, assume the specialized converter is to be defined in an 'AccountConverter' class, DTF 106 or another entity may create an 'AccountConverter' class and may define a 'status' method of an 'AccountConverter' object instance to perform the data conversion. Example code (comments are lines that start with '//') for a 'status' method in an 'AccountConverter' class is:

```
    public static Object status(Object. . . args) {
    // Note that args[1] relates to the value to be converter.
    Object value = args[1];
    if ( value instanceof Integer) {
        String stringValue =
        AccountStatus.getAccountStatus((int)value);
        return Account.StatusEnum.valueOf(stringValue);
    }
    return AccountStatus.getAccountStatus(value.toString( ).
toUpperCase( ));
    }.
```

In some embodiments, server 104, DTF 106, and/or another entity may use a base or default converter when a specialized converter is not needed. For example, if no <Entity>Converter is available or needed for a given entity, then a base or default converter (e.g., BaseConverter) may be called. The BaseConverter may handle conversions on fields that are common to most entities, e.g., ID may be converter to Poid. In some embodiments, fields defined in an <Entity>Converter will override the fields defined in the BaseConverter and if a field is not defined in either the <Entity>Converter or the BaseConverter, then no conversion may be needed for that field.

In some embodiments, e.g., where there are multiple FListIDs based on an action performed (e.g., 'UPDATE' vs 'CREATE') or based on a value of a field, server 104, DTF 106, and/or another entity may define an <Entity>Converter and specify one or more fields for which conversion is to be performed. For example, for a field 'Name' in an 'Account' entity, if an HTTP method is 'CREATE', the field 'Name' may be converted to a FListID 'FldNameCreate', while if an HTTP method is 'UPDATE', the field 'Name' may be converted to a FListID 'FldNameUpdate'. Example code for a method 'name' in an 'AccountConverter' class is:

```
public static Object name(Object... args) throws
ClassNotFoundException, NoSuchMethodException, IllegalAccessException,
InvocationTargetException {
        ActionEnum action = (ActionEnum) args[0];
        Object value = args[1];
        if ( action.equals(ActionEnum.CREATE) ) {
            return TranslatorUtils.getFListIdObj("FldNameCreate");
        } else {
            if ( action.equals(ActionEnum.UPDATE) ) {
                return TranslatorUtils.getFListIdObj("FldNameUpdate");
            }
        }
        return value;
    }.
```

In some embodiments, a converter may utilize various, e.g., one or more inputs. For example, assuming Converter.convert(fieldName, value, action, className) is the method for calling a converter, then lieldName' may be the name of the field to convert (e.g., name, id, status, etc.), 'value' may be the actual value of the field to be converted (e.g., for status '1001' is to be converted), 'action' may be the current action being performed (e.g., CREATE, GET, UPDATE, MODIFY, etc.) or may identify a type or related field, and 'className' may be the entity class being worked on (e.g., Account, Subscription, etc.).

In some embodiments, server 104, DTF 106, and/or another entity may call and/or use a validator (e.g., software and/or validation rules) for validation fields, data, or types of data. For example, when DTF 106 calls a marshaller to marshall/unmarshall an entity, one or more validators may be used for validating various data portions (e.g., fields or FListIDs defined in the metadata or mapping template).

In some embodiments, a validator may be called for marshalling data from JSON to FList. In some embodiments, a validator may not be called for unmarshalling data from FList to JSON because it may be assumed that the values coming back from legacy system 110 are valid.

In some embodiments, server 104, DTF 106, and/or another entity may create and use specialized or customized validators. In such embodiments, server 104, DTF 106, and/or another entity may use metadata (e.g., a mapping template) for creating one or more validators. For example, if fields of a given JSON entity require specialized validation (e.g., different than fields of another JSON entity), then a specialized validator for the given JSON entity may be defined. In this example, the specialized validator may be a class created in a software package (e.g., a REST.validator package) and may have the class name '<Entity>Validator', where <Entity> is the name of the JSON entity.

For example, for a 'contacts' entity, DTF 106 may validate a number of field values associated with a contact. In this example, assume a specialized validator is to be defined in an 'AccountValidator' class, DTF 106 or another entity may create an 'AccountValidator' class and may define a 'contacts' method of an 'AccountValidator' object instance to perform the data conversion. Example code (comments are lines that start with '//') for a 'contacts method in an 'AccountValidator' class is:

```
public static Object contacts(Object... args) throws
IllegalAccessException, NoSuchMethodException,
InvocationTargetException, InvalidRequestException,
ClassNotFoundException, NoSuchFieldException {
        Validator.validateMandatory(args);
```

-continued

```
        Object value = args[1];
        return value;
    }
```

In some embodiments, server 104, DTF 106, and/or another entity may use a base or default validator when a specialized validator is not needed. For example, if no <Entity>Validator is available or needed for a given entity, then a base or default validator (e.g., BaseValidator) may be called. The BaseValidator may handle validation on fields that are common to most entities, e.g., ID may be validator to Poid. In some embodiments, fields defined in an <Entity>Validator will override the fields defined in the BaseValidator and if a field is not defined in either the <Entity>Validator or the BaseValidator, then no validation may be needed for that field.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

FIGS. 2A-2B depict example metadata 200-202 for validating and/or converting between data formats. Metadata 200-202 may include information for identifying related or corresponding data elements from different data formats, e.g., JSON and Flist formats. Metadata 200-202 may include information for handling data storage or data representation for one or both data formats. Metadata 200-202 may also include information, logic, or conversion rules related to data conversion.

Referring to FIGS. 2A-2B, a table representing metadata 200-202 comprises columns and/or fields for data entries and related description about the data entries. A data entry field may store information for representing a data entity or portion thereof (e.g., a data element or a data field) for storing information in a JSON format (e.g., a JSON data object) or another format (e.g., Flist data). In some embodiments, the data entry field may also include a data type or an example field name related to or indicative of a data entity or related type.

In some embodiments, metadata 200-202 may include a group of related data entries representing a data entity or related data. For example, as shown in the table of FIG. 2A, a group of data entries may represent an 'Account' data entity or related data. In this example, various depicted rows or data entries may indicate one or more fields (type, account number, etc.) and one or more other data entities (e.g., contacts, phones, preferences, etc.) associated with the 'Account' data entity.

In some embodiments, metadata 200-202 may include mapping information for associating related data elements among data formats. In some embodiments, DTF 106 or a related entity may use the mapping information when converting or translating data between data formats. For example, as shown in the table of FIG. 2A, a JSON field name 'accountNumber' may map to a FlistID 'FldAccountNo'.

In some embodiments, metadata 200-202 may include information for identifying a converter or related logic to use during data conversion. For example, server 104 or DTF 106 may use metadata 200-202 to identify which logic, rules, or software module to use, e.g., consumer user account data may need to be processed differently than business user account data.

In some embodiments, metadata 200-202 may include information for identifying a validator or related logic to use during data validation. For example, server 104 or DTF 106 may use metadata 200-202 to identify that some fields are to be validated before or during data conversion, e.g., converting from JSON to FList. In this example, as shown in the table of FIG. 2B, a JSON 'contacts' data entity may be associated with a 'validation:[mandatory]' designation and, as such, DTF 106 or a related validator may perform validation on the field values associated with the 'contacts' entity, e.g., before the marshaller assigns the values to a FList data set.

A description field may store information logic, context, or examples for describing or defining a corresponding data entry. For example, a description field may define how related data is stored, converted, or used. In another example, a description field may define how related data is derived, obtained, or generated.

In some embodiments, various description information may be stored and/or represented as programming logic, data variables, or other formats. For example, 'if/else' logic may be used to represent when default values are used or not used.

It will be appreciated that metadata 200-202 is for illustrative purposes and that different and/or additional data than the data depicted in FIGS. 2A-2B may be usable for indicating conversion logic, format preferences, data format relationships, or other information. Further, metadata 200-202 may be stored (e.g., in data storage 108) or managed using various data structures and/or computer readable media.

FIG. 3 depicts example default values data 300 related to converting between data formats. Data 300 may include information for identifying or determining default values for various data types, data fields, and/or data entities. For example, data 300 may include numbers, values, text, and/or data pointers or identifiers for functions or software to obtain values. In this example, a default value may involve executing a method or function, e.g., code for generating a pseudo-random number or retrieving a computer's internet protocol (IP) address.

Referring to FIG. 3, a table representing data 300 comprises columns and/or fields for FList identifiers (FListID) types, FListID type examples, data entity mapping types, and data entity mapping examples. A FListID type field may store information for representing a type of data portion (e.g., a data element or a data field) in a FList format or a related file. For example, example FListID types may include 'IntField', 'PoidField', 'StrField', and/or 'ArrayField'.

A FListID type example field may store information for representing one or more FListIDs that are examples of a corresponding type of data portion (e.g., a data element or a data field) in a FList format or a related file. For example, some FListID type examples may include: 'FldFlags' (an example of an intField' type), 'FldPayType' (an example of an 'IntField' type), 'FldPoid' (an example of an 'PoidField' type), 'FldName' (an example of an 'StrField' type), 'FldContactType' (an example of an 'StrField' type), 'FldLocale' (an example of an 'StrField' type), 'FldAccountNo' (an example of an 'StrField' type), 'FldBillinfold' (an example of an 'StrField' type), and/or 'FldBalInfo' (an example of an 'ArrayField' type).

A data entity mapping type field may store information for representing a type of data portion (e.g., a data element or a data field) in a JSON format or a related file. For example, example data entity mapping types may include 'int', 'string', 'method call', and/or 'null'. In some embodiments, a method or function call may take predefined and/or other values or parameters as input. For example, a method 'generateRandomNumber' may generate a ten-digit random number and may include optional inputs, e.g., a preceding string and a separator character. In this example, if no inputs are provided, the method may generate a ten-digit random number, e.g., 4827495827. In another example, if a preceding string 'ABC' is inputted in the method, e.g., generateRandomNumber(ABC); the method may generate a 10-digit random number preceded by the given string, e.g., ABC4827495827. In another example, if a preceding string 'ABC' and a separator '–' are inputted in the method, e.g., generateRandomNumber(ABC,-), the method may generate a 10-digit random number preceded by the given string and the separator, e.g., ABC-4827495827.

A data entity mapping example field may store information for representing a data portion (e.g., a data element or a data field) in a JSON format or a related file. Some data entity mapping examples may indicate a JSON field name (e.g., 'field: id') corresponding to a FListID (e.g., 'FListId: FldPoid'). Some data entity mapping examples may indicate that a default value for a corresponding FListID exists, e.g., 'FListDefault: true'. Some data entity mapping examples may indicate a default value for a corresponding FlistiD or call a method to get the corresponding FlistID, e.g., 'FListDefaultValue: getName( )'.

It will also be appreciated that data 300 is for illustrative purposes and that different and/or additional data than the data depicted in FIG. 300 may be usable for indicating default values for particular data portions or other information. Further, data 300 may be stored (e.g., in data storage 108) or managed using various data structures and/or computer readable media.

FIG. 4 depicts example request data 400 in a JSON data format. Request data 400 may be data generated or provided from client 112. For example, client 112 may represent a web-based UI that acts as a user front into a cloud-based BRM system (e.g., system 102). In this example, the UI may be programmed using JavaScript or another programming language and may store user input in a JSON format. In this example, client 112 may generate and send an HTTP Post message to server 104 or DTF 106. The HTTP Post message may include user input for generating a new billing account (e.g., request data 400).

As depicted in FIG. 4, request data 400 in a JSON format may generally represent an entity or object within curly brackets "{ }",wherein the object may also include additional objects and fields or parameters. Sub-objects and object parameters may be indented relative to its parent. A field may be represented by a field name in quotation marks followed by a colon and then its value (e.g., "City": "New York"). A text value in JSON format is generally between quotation marks and a number value is generally not between quotation marks. *Internet Engineering Task Force (IETF) Request for Comments (RFC)* 8259 dated December 2017 provides additional details regarding an example JSON format, the disclosure of which is incorporated herein by reference.

It will also be appreciated that request data 400 is for illustrative purposes and that different and/or additional data than the data depicted in FIG. 4 may be usable for indicating data or input for translation or conversion to another data format. Further, request data 400 may be stored or managed using various data structures and/or computer readable media.

FIG. 5 depicts example request data 500 in a FList data format. Request data 500 may be data converted from a JSON format to a FList format. For example, server 104 or DTF 106 may receive request data 400 from client 112 and may convert or translate request data 400 to request data 500. In this example, the conversion or translation may be performed by a marshaller configured using metadata 202-204 and/or other information.

In some embodiments, DTF 106 or related software (e.g., a marshaller) may be configured to convert or translate data from one format into valid data in another format. For example, using metadata 202-204 and/or related conversion rules, DTF 106 may modify certain text to allow for special characters in a particular format, like single or double quotes, (e.g., by using a backslash or other 'escape' sequence in front of the special character). In another example, using metadata 202-204 and/or related conversion rules, DTF 106 may modify a value to different value, e.g., adjust a number to fit a valid range in the new format or to change value from text to a corresponding numeric value.

Referring to FIG. 5, request data 500 may include fields and sub-fields representing a billing account to be created by system 102 or legacy system 110. For example, DTF 106 or related software (e.g., a marshaller) may be configured using metadata 202-204. In this example, DTF 106 may generate request data 500 by determining, using metadata 202-204 and/or related conversion rules, relevant field names and field values from corresponding data in request data 400. Continuing with this example, DTF 106 may also create default values and/or modify values when performing data conversion.

As depicted in FIG. 5, a line of request data 500 in a FList format may include, from left to right, a first value (e.g., 0=top level, 1=sub-level, 2=sub-sub level, etc.) indicating a nesting level, a second value indicating a field identifier (e.g., PIN_FLD_BILLINFO, PIN_FLD_POID, etc.), a third value indicating a field type (e.g., ARRAY, STR, INT, etc.), a fourth value indicating an element identifier, e.g., [0], [1],etc.), and a fifth value indicating a value (e.g., text, a memory pointer, or a number) for the field. The *Oracle® Communications Billing and Revenue Management Developer's Guide (Release 7.5)* dated August 2016 provides additional details regarding an example FList format, the disclosure of which is incorporated herein by reference.

It will also be appreciated that request data 500 is for illustrative purposes and that different and/or additional data than the data depicted in FIG. 5 may be usable for indicating data or input for processing by legacy system 110. Further, request data 500 may be stored or managed using various data structures and/or computer readable media.

FIG. 6 depicts example output in a FList data format. Output 600 may be data generated or provided by legacy system 110. For example, legacy system 110 may receive a PCM request, also may be referred to as an OPCODE request, that includes request data 500 and may process the PCM request. In this example, the PCM request may involve adding or creating a new billing account. Continuing with this example, after processing the PCM request, output 600 may be generated and may be sent to server 104 or DTF 106 therein.

In some embodiments, output 600 may indicate that a related request was successful. For example, output 600 may indicate the current or valid stored data (e.g., data after processing a PCM request). In this example, client 112 or another entity may be able to inspect output 600 and determine a related request was successful by detecting that output 600 includes changes or updates requested.

In some embodiments, output 600 may indicate that an error occurred or that a related request (e.g., an HTTP Post message or an HTTP GET message) was unsuccessful. For example, output 600 may include an error message or an error code or may indicate the current or valid stored data (e.g., data prior to a PCM request). In this example, client 112 or another entity may be able to inspect output 600 and determine a related request was unsuccessful by detecting the error message or an error code.

Referring to FIG. 6, output 600 may include fields and sub-fields representing a billing account created by system 102 or legacy system 110. For example, output 600 may include one or more billing account identifiers and information for deriving one or more URLs or links to billing account information associated with system 102 or legacy system 110.

In some embodiments, output 600 or a related response message may be generated after performing an operation associated with a request is attempted. For example, legacy system 110 may process a PCM request by performing a database commit or update operation and then generate output 600 related to the operation. In this example, if successful, legacy system 110 may send a copy of the stored billing account information to server 104 in an HTTP 201 message. However, if unsuccessful, legacy system 110 may send an error message or an error code in an HTTP 409 message.

It will also be appreciated that output 600 is for illustrative purposes and that different and/or additional data than the data depicted in FIG. 6 may be usable for indicating data or output for translation or conversion to another data format. Further, output 600 may be stored or managed using various data structures and/or computer readable media.

FIG. 7 depicts example output 700 in a JSON data format. Output 700 may be data converted from a FList format to a JSON format. For example, server 104 or DTF 106 may receive output 600 from legacy system 110 and may convert or translate output 600 to output 700. In this example, the conversion or translation may be performed by a marshaller configured using metadata 202-204 and/or other information.

In some embodiments, DTF 106 or related software (e.g., a marshaller or converter) may be configured to convert or translate data from one format into valid data in another format. For example, using metadata 202-204 and/or related conversion rules, DTF 106 may derive URLs from FList data and provide the URLs in valid JSON format.

Referring to FIG. 7, output 700 may include a 'billings Preferences' data portion containing URLs or links to various preferences stored at or associated with system 102 or legacy system 110. For example, client 112 may receive output 700 and may use the links therein to display hyperlinks in a related UI.

In some embodiments, output 700 or a related response message (e.g., an HTTP Post message) may be inspected to determine whether a related request was successful. For example, client 112 may receive output 700 and then inspect information from the provided URLs to determine that changes or additions were successfully performed. In another example, determine whether a related request was successful may at least in part be based on identifying a response message type, e.g., HTTP 2XX messages=successful and HTTP 4XX-5XX messages=failure.

It will also be appreciated that output 700 is for illustrative purposes and that different and/or additional data than the data depicted in FIG. 7 may be usable for indicating data or output for client 112. Further, output 700 may be stored or managed using various data structures and/or computer readable media.

FIG. 8 is a diagram illustrating an example data marshalling process 800. Referring to FIG. 8, process 800 may be performed when marshalling data from one format to another format.

At step 802, a marshaller (e.g., software executing at server 104, DTF 106, or a related processor) may receive a data entity (e.g., a JSON object containing multiple field values) for marshalling data from JSON to FList.

At step 804, a translator (e.g., software executing at server 104, DTF 106, or a related processor) may receive a value for translating from JSON to
FList. In some embodiments, the translation may be performed in accordance with metadata 200-202 (e.g., a mapping template) and may require data validation and/or data conversion.

At step 806, a validator and/or a converter (validator/converter) (e.g., software executing at server 104, DTF 106, or a related processor) may receive the data entity or related values for processing. In some embodiments, the validator/converter may utilize or call a method based on on the field or value being processed.

At step 808, a listener (e.g., software executing at server 104, DTF 106, or a related processor) may determine based on received values and required processing whether to instantiate (e.g., create instances) one or more classes or objects for processing. For example, the listener may start up or instantiate a base validator and a specialized validator for processing a data entity or a value therein.

At step 810, it may be determined whether a corresponding method in a specialized validator/converter exists for processing a particular value associated the received data entity. If the method exists, the specialized validator/converter may process the value.

At step 812, if the method does not exist in a specialized validator/converter, it may be determined whether a corresponding method in a base validator/converter exists for processing a particular value associated the received data entity. If the method exists, the base validator/converter may process the value.

In some embodiments, after processing a value (or if no processing is needed), a subsequent value from a data entity can be processed until the data entity is completely marshalled from JSON to FList.

It will also be appreciated that process 800 is for illustrative purposes and that different and/or additional steps and/or entities than depicted in FIG. 8 may be usable for performing data marshalling and/or other data processing.

Figure 9:
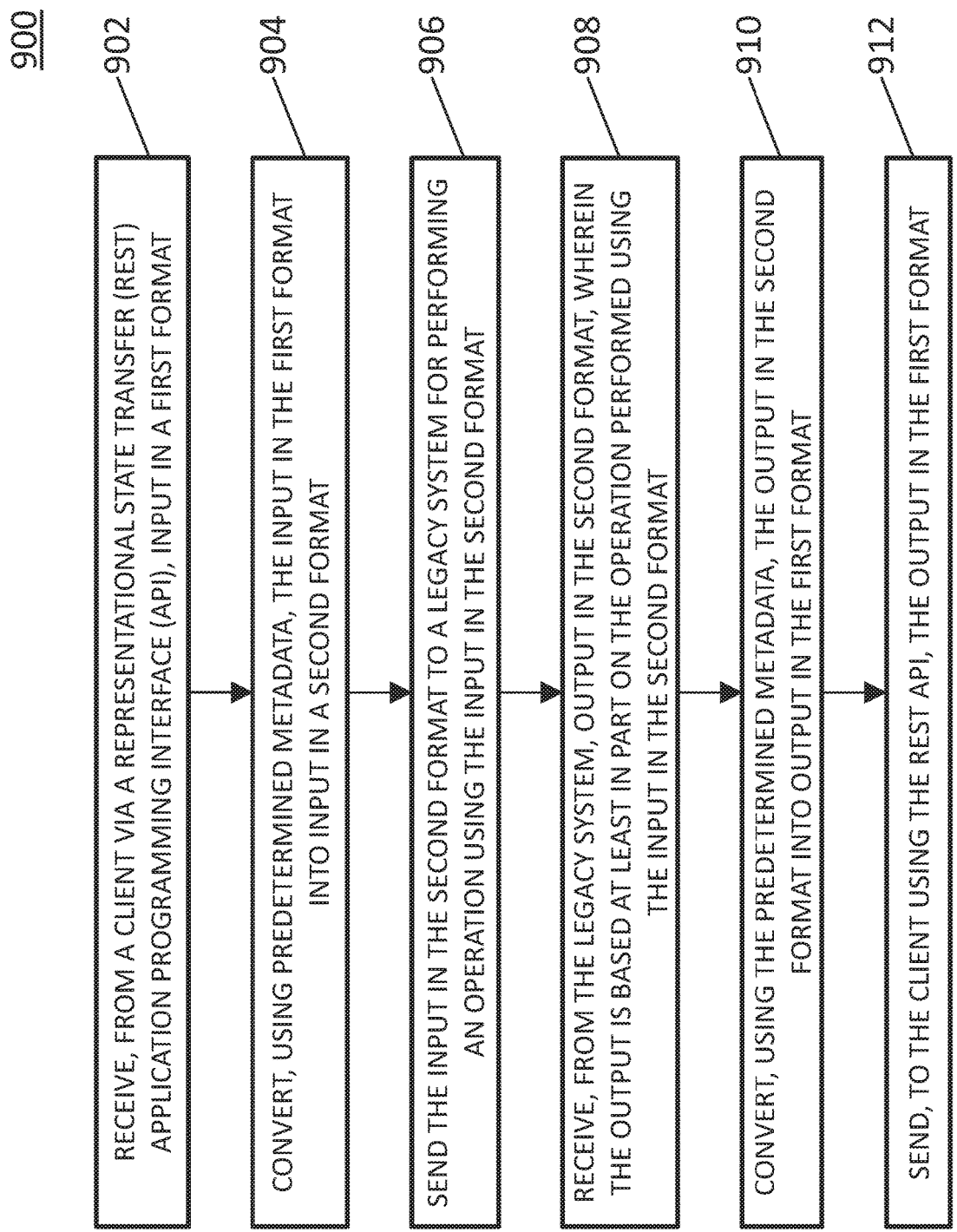
FIG. 9 is a diagram illustrating an example process for REST based data conversion.

FIG. 9 is a diagram illustrating an example process 900 for REST based data conversion. In some embodiments, process 900, or portions thereof (e.g., steps 902, 904, 906, 908, 910, and/or 912), may be performed by or at server 104, DTF 106, and/or another node or module.

Referring to process 900, in step 902, input in a first format may be received. For example, a HTTP PUT request including a payload containing data in a JSON format may be sent from client 112 to server 104. In this example, the payload may include account information for adding or updating an account handled by legacy system 110.

In step 904, the input in the first format may be converted, using predetermined metadata, into input in a second format. For example, server 104 or related DTF 106 may use a marshaller configured using predetermined metadata to convert or transform JSON data into FList data.

In some embodiments, the first format may be a JSON format or an extensible markup language (XML) format and the second format may be a FList format or a PCM format. In some embodiments, the first format may be a FList format or a PCM format and the second format may be a JSON format or an XML format.

In some embodiments, converting, using the predetermined metadata, the data in the first format into data in a second format may include selecting conversion rules based on an action to perform (e.g., an 'ctionEnum') or a HTTP method or request type (e.g., DELETE, POST, GET, PUT, or PATCH).

In some embodiments, the conversion rules may include a rule for validating a value in the first format and/or a rule for changing the value in the first format that is invalid to a valid value in the second format In some embodiments, converting, using the predetermined metadata, the data in the first format into data in a second format may include using the predetermined metadata and reflection programming to generate conversion logic. For example, reflection programming allows software to inspect code at runtime and generate classes and/or instances of classes or other structures for transforming data from one format to another format based on predetermined metadata.

In step 906, the input in the second format may be sent to legacy system 110 for performing an operation using the input in the second format. For example, after DTF 106 converts JSON data into FList data, server 104 may send the FList data via a PCM API to legacy system 110. In this example In step 908, output in the second format may be received from legacy system 110, wherein the output may be based at least in part on the operation performed using the input in the second format. For example, legacy system 110 may process FList data (e.g., by adding or updating account information for a particular account) and may generate output in the FList format.

In step 910, the output in the second format may be converted, using the predetermined metadata, into output in the first format. For example, server 104 or related DTF 106 may use a marshaller configured using predetermined metadata to convert or transform FList data into JSON data.

In step 912, the output in the first format may be sent to client 112 via the REST API. For example, after converting output received from legacy system 110 to JSON data, server 104 may generate an HTTP 201 response containing the JSON data and send the response to client 112.

In some embodiments, one or more backward compatibility tests may be performed to test whether data translation and/or conversion is accurate, e.g., is converted data valid. For example, server 104 or DTF 106 may execute a test for determining whether data converted from one format to another format is valid. In this example, server 104 or DTF 106 may be configured for determining which portions are invalid or what data is missing and may provide test data or related reports to an end user or other relevant entity.

In some embodiments, a backward compatibility test may be triggered in response to receiving additional metadata from an operator or the client. For example, DTF 106 may receive a new metadata file during run-time for extending or expending translation and/or conversion capabilities. In this example, after receiving the new metadata file, DTF 106 or a related entity may trigger one or more tests before using the metadata file to perform data translation and/or conversion.

In some embodiments, output in a first format may be sent to client 112. For example, client 112 may receive output as one or more JSON objects and may use that data to populate or update a web-based user interface.

In some embodiments, client 112 may include a user interface application, an external system, a customer relationship management system, a cloud service, a web service, a REST API client, or financial software.

It will be appreciated that process 900 is for illustrative purposes and that different and/or additional actions may be used. It will also be appreciated that various actions described herein may occur in a different order or sequence.

It should be noted that system 102, server 104, DTF 106, and/or functionality described herein may constitute a special purpose computing device. Further, system 102, server 104, DTF 106, and/or functionality described herein can improve the technological field of network communications by providing mechanisms and/or techniques for data conversion between different data formats. For example, by utilizing predetermined metadata and reflection programming principles, software or conversion logic can be generated that converts or translates JSON data to FList data or vice versa in various service domains. In another example, by using a REST API and DTF 106, a first entity (e.g., a web user interface application, a front end, financial software, etc.) can communicate with a system or service (e.g., legacy system 110) that uses a data format (e.g., e.g., FList or PCM) that is not supported by the first entity.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as group forth hereinafter.

What is claimed is:

1. A method for data translation using a representational state transfer (REST) application programming interface (API), the method comprising:
    at a server comprising a metadata-based data translation framework for providing data translation and facilitating interaction with a legacy system using a REST API:
        receiving, from a client via the REST API using a hypertext transfer protocol (HTTP) request message, input in a first format, wherein the input includes an object type identifier;
        generating, at runtime and using the HTTP request message, conversion logic for converting between a first format and a second format; wherein the conversion logic is generated using predetermined metadata and reflection programming, wherein generating the conversion logic includes instantiating, at runtime, a marshaller object based on the object type identifier and the request type of the HTTP request message;
        converting, using the conversion logic, the input in the first format into input in a second format, wherein converting the input in the first format into input in the second format includes validating that a value of the input in the first format is valid in the second format and, in response to determining that the value in the first format is invalid in the second format, changing the value in the first format to a valid value in the second format;
        sending the input in the second format to the legacy system for performing an operation using the input in the second format;
        receiving, from the legacy system, output in the second format, wherein the output is based at least in part on the operation performed using the input in the second format;
        converting, using the conversion logic, the output in the second format into output in the first format; and
        sending, to the client via the REST API, the output in the first format.

2. The method of claim 1 wherein the first format is a JavaScript object notation (JSON) format or an extensible markup language (XML) format and the second format is a field list (FList) format or a portal communications module (PCM) format.

3. The method of claim 1 wherein the first format is a field list (FList) format or a portal communications module (PCM) format and the second format is a JavaScript object notation (JSON) format or an extensible markup language (XML) format.

4. The method of claim 1 wherein an action to perform or a hypertext transfer protocol (HTTP) request type.

5. The method of claim 1 comprising:
    performing a backward compatibility test for determining whether data in the second format is valid or for determining whether the output in the first format is valid.

6. The method of claim 5 wherein the backward compatibility test is triggered in response to receiving additional metadata from an operator or the client.

7. The method of claim 1 wherein the client includes a user interface application, an external system, a customer relationship management system, a cloud service, a web service, a REST API client, or financial software.

8. A system for data translation using a representational state transfer (REST) application programming interface (API), the system comprising:
  at least one processor; and
  a server comprising a metadata-based data translation framework for providing data translation and facilitating interaction with a legacy system using a REST API, wherein the server is implemented using the at least one processor; wherein the server is configured for:
    receiving, from a client via the REST API using a hypertext transfer protocol (HTTP) request message, input in a first format, wherein the input includes an object type identifier;
    generating, at runtime and using the HTTP request message, conversion logic for converting between a first format and a second format; wherein the conversion logic is generated using predetermined metadata and reflection programming, wherein generating the conversion logic includes instantiating, at runtime, a marshaller object based on the object type identifier and the request type of the HTTP request message;
    converting, using the conversion logic, the input in the first format into input in a second format, wherein converting the input in the first format into input in the second format includes validating that a value of the input in the first format is valid in the second format and, in response to determining that the value in the first format is invalid in the second format, changing the value in the first format to a valid value in the second format;
    sending the input in the second format to the legacy system for performing an operation using the input in the second format;
    receiving, from the legacy system, output in the second format, wherein the output is based at least in part on the operation performed using the input in the second format;
    converting, using the conversion logic, the output in the second format into output in the first format; and
    sending, to the client via the REST API, the output in the first format.

9. The system of claim 8 wherein the first format is a JavaScript object notation (JSON) format or an extensible markup language (XML) format and the second format is a field list (FList) format or a portal communications module (PCM) format.

10. The system of claim 8 wherein the first format is a field list (FList) format or a portal communications module (PCM) format and the second format is a JavaScript object notation (JSON) format or an extensible markup language (XML) format.

11. The system of claim 8 wherein the server is configured for selecting conversion rules based on an action to perform or a hypertext transfer protocol (HTTP) request type.

12. The system of claim 8 wherein the server is configured for performing a backward compatibility test for determining whether data in the second format is valid or for determining whether the output in the first format is valid.

13. The system of claim 12 wherein the server is configured to trigger the backward compatibility test in response to receiving additional metadata from an operator or the client.

14. The system of claim 8 wherein the client includes a user interface application, an external system, a customer relationship management system, a cloud service, a web service, a REST API client, or financial software.

15. A non-transitory computer readable medium comprising computer executable instructions that when executed by a processor of a computer cause the computer to perform steps comprising:
  at a server comprising a metadata-based data translation framework for providing data translation and facilitating interaction with a legacy system using a representational state transfer (REST) API:
    receiving, from a client via the REST API using a hypertext transfer protocol (HTTP) request message, input in a first format, wherein the input includes an object type identifier;
    generating, at runtime and using the HTTP request message, conversion logic for converting between a first format and a second format; wherein the conversion logic is generated using predetermined metadata and reflection programming, wherein generating the conversion logic includes instantiating, at runtime, a marshaller object based on the object type identifier and the request type of the HTTP request message;
    converting, using the conversion logic, the input in the first format into input in a second format, wherein converting the input in the first format into input in the second format includes validating that a value of the input in the first format is valid in the second format and, in response to determining that the value in the first format is invalid in the second format, changing the value in the first format to a valid value in the second format;
    sending the input in the second format to the legacy system for performing an operation using the input in the second format;
    receiving, from the legacy system, output in the second format, wherein the output is based at least in part on the operation performed using the input in the second format;
    converting, using the conversion logic, the output in the second format into output in the first format; and
    sending, to the client via the REST API, the output in the first format.

16. The non-transitory computer readable medium of claim 15 wherein the first format is a JavaScript object notation (JSON) format or an extensible markup language (XML) format and the second format is a field list (FList) format.

17. The method of claim 1 wherein generating the conversion logic includes instantiating, at runtime, a converter object and wherein converting the input in the first format into the input in the second format includes using the converter object.

18. The method of claim 1 wherein generating the conversion logic includes determining, using the object type identifier, whether a specialized validator is needed for validating the input in the first format, and in response to determining that the specialized validator is needed, instantiating, at runtime, the specialized validator for validating whether at least some input in the first format is valid in the second format.

19. The system of claim 8 wherein the server is configured for instantiating, at runtime, a converter object and wherein converting the input in the first format into the input in the second format includes using the converter object.

20. The system of claim 8 wherein the server is configured for determining, using the object type identifier, whether a specialized validator is needed for validating the input in the first format, and in response to determining that the specialized validator is needed, instantiating, at runtime, the specialized validator for validating whether at least some input in the first format is valid in the second format.

\* \* \* \* \*

UNITED STATES PATENT AND TRADEMARK OFFICE
CERTIFICATE OF CORRECTION

PATENT NO. : 11,561,997 B2
APPLICATION NO. : 16/352738
DATED : January 24, 2023
INVENTOR(S) : Pigeon et al.

It is certified that error appears in the above-identified patent and that said Letters Patent is hereby corrected as shown below:

On the Title Page

On page 2, Column 2, item (56) under U.S. Patent Documents, Line 5, delete "Sarldakl" and insert -- Saridaki --, therefor.

On page 3, Column 1, item (56) under Other Publications, Line 20, delete "Managemen" and insert -- Management --, therefor.

On page 3, Column 1, item (56) under Other Publications, Line 21, delete "Relase" and insert -- Release --, therefor.

On page 3, Column 1, item (56) under Other Publications, Line 28, delete "Allowace" and insert -- Allowance --, therefor.

In the Specification

In Column 9, Line 33, delete "lieldName'" and insert -- 'field Name' --, therefor.

In Column 10, Line 34, after "}" insert -- . --.

In Column 12, Lines 51-57, delete "JSON field name (e.g., 'field: id') corresponding to a FListID (e.g., 'FListid: FldPoid'). Some data entity mapping examples may indicate that a default value for a corresponding FListID exists, e.g., 'FListDefault: true'. Some data entity mapping examples may indicate a default value for a corresponding FlistiD or call a method to get the corresponding FlistID, e.g., 'FListDefaultValue: getName( )'." and insert the same on Column 12, Line 50, as a continuation of the same paragraph, therefor.

In Column 13, Line 67, delete "identifier, e.g.," and insert -- identifier (e.g., --, therefor.

In Column 15, Lines 44-47, delete "FList. In some embodiments, the translation may be performed in Signed and Sealed this
Ninth Day of January, 2024

Katherine Kelly Vidal
*Director of the United States Patent and Trademark Office*

CERTIFICATE OF CORRECTION (continued)
U.S. Pat. No. 11,561,997 B2 accordance with metadata 200-202 (e.g., a mapping template) and may require data validation and/or data conversion." and insert the same on Column 15, Line 43, as a continuation of the same paragraph, therefor.

In Column 15, Line 52, delete "on on" and insert -- on --, therefor.

In Column 16, Line 39, delete "'ctionEnum')" and insert -- 'ActionEnum') --, therefor.

In Column 16, Line 45, delete "format" and insert -- format. --, therefor.

In the Claims

In Column 18, Line 53, in Claim 4, after "wherein" insert -- generating the conversion logic includes selecting conversion rules based on --, therefor.